United States Patent
Miller et al.

(10) Patent No.: US 9,954,380 B2
(45) Date of Patent: Apr. 24, 2018

(54) DECORATIVE CHARGER CABLE APPARATUS

(71) Applicant: Halo2Cloud LLC, Glastonbury, CT (US)

(72) Inventors: Garold C. Miller, Glastonbury, CT (US); Nathan Daniel Weinstein, Glastonbury, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 170 days.

(21) Appl. No.: 14/978,128

(22) Filed: Dec. 22, 2015

(65) Prior Publication Data

US 2016/0233703 A1    Aug. 11, 2016

Related U.S. Application Data

(60) Provisional application No. 62/112,930, filed on Feb. 6, 2015.

(51) Int. Cl.
| | |
|---|---|
| *H02J 7/00* | (2006.01) |
| *A45F 5/00* | (2006.01) |
| *A45F 5/02* | (2006.01) |
| *A45C 13/00* | (2006.01) |
| *A45C 13/08* | (2006.01) |

(52) U.S. Cl.
CPC .......... *H02J 7/0042* (2013.01); *A45C 13/001* (2013.01); *A45C 13/08* (2013.01); *A45F 5/00* (2013.01); *A45F 5/02* (2013.01); *A45F 5/021* (2013.01); *A45F 2005/006* (2013.01); *A45F 2005/008* (2013.01)

(58) Field of Classification Search
CPC .............................. H02J 7/0042; A43B 23/24
USPC ............................ 439/502; 36/136; D13/108
See application file for complete search history.

(56) References Cited

U.S. PATENT DOCUMENTS

| | | |
|---|---|---|
| 1,413,618 A | 4/1922 | Rosenblum |
| 1,896,060 A | 1/1933 | Colby |
| 2,107,459 A | 2/1938 | Weller |
| 2,762,056 A | 9/1956 | Glagovsky |
| 3,105,243 A | 10/1963 | Kampfe et al. |
| D429,281 S | 8/2000 | Miller et al. |
| D683,991 S | 6/2013 | Smith |
| D716,052 S | 10/2014 | Sappenfield-Chan |
| D730,637 S | 6/2015 | Maddocks |

(Continued)

OTHER PUBLICATIONS

Michael Zhang, This Stylish Leather Tassel is Actually a USB Charging Cable in Disguise, Sep. 12, 2014, <https://petapixel.com/2014/09/12/stylish-leather-tassel-actually-usb-charging-cable-disguise/>, pp. 1-4.*

*Primary Examiner* — Drew A Dunn
*Assistant Examiner* — Zixuan Zhou
(74) *Attorney, Agent, or Firm* — McCormick, Paulding & Huber LLP

(57) ABSTRACT

A charger cable apparatus includes a charger cable with a first end and a second end, each end including a connector interface adapted for engagement with a complementary connection port or plug. The apparatus also includes decorative tassels provided on each end of the cable that are adapted to slide over the ends of the cables to conceal or to reveal the male connector interfaces. Optionally, the tassels can be incorporated into a sleeve that entirely covers the cable.

11 Claims, 4 Drawing Sheets

(56) References Cited

U.S. PATENT DOCUMENTS

2012/0289080 A1\* 11/2012 Huang ............... H01R 13/6658
  439/502
2015/0201708 A1\* 7/2015 Maddocks ............. A43B 23/24
  36/136

\* cited by examiner

DECORATIVE CHARGER CABLE APPARATUS

CROSS-REFERENCE TO RELATED APPLICATIONS

This application is a non-provisional of, and claims the benefit of, U.S. Provisional Application No. 62/112,934, filed Feb. 6, 2015, which is incorporated herein by reference.

BACKGROUND

Technical Field

The invention relates generally to fashion accessories and to electronic charger cables for charging portable electronic devices. Particular embodiments relate to electronic charger cables that are usable as fashion accessories.

Discussion of Art

Battery-powered portable electronic devices, such as cellular phones, have become ubiquitous. Also ubiquitous is a problem that the battery of a portable electronic device can run out of battery charge (i.e., become depleted) during use of the device, or while the device is being carried around. Once depleted, the battery needs to be recharged which requires the electronic device to be connected to a power source. Commonly, devices come with charger cables, but often, the user does not keep the charger cable with the device as it may take up too much storage space, for example in a pocket or a bag. Nonetheless, it is desirable to keep a charger cable handy and close by—where a user carries a charger cable, then a depleted portable electronic device can be used while charging. However, where the user does not carry a charger cable with the device, then a depleted portable electronic device becomes unusable until a charger cable is acquired and the device is recharged.

Sometimes, users of portable electronic devices do not carry charger cables because the cables are bulky and would take up space in the users' handbags, backpacks, or the like. Sometimes, users of portable electronic devices misplace their charger cables because the cables can be removed easily from the portable electronic devices (which the user will carry with them) but not so easily from wall power outlets or the like, or for other reasons the cables may simply be misplaced. Still further, standard charger cables are unsightly and users typically want to have them hidden or out of sight, or just left at home.

Accordingly, in view of the foregoing, there is a need for a charger cable usable with commonly available portable electronic devices that is easy to transport and keep close by for situations where such a cable is needed (e.g., to recharge a portable electronic device) but which will not take up extra space or be likely to be misplaced. There is further a need for a charger cable that is aesthetically pleasing so a fashion-conscious user will not be deterred from carrying it in public. Accordingly, it is a general object of the present invention to provide a decorative charger cable apparatus that improves upon conventional charger cables on the market and overcomes the problems and drawbacks associated with such prior art charger cables.

BRIEF DESCRIPTION

Embodiments of the invention provide a charger cable apparatus, which comprises a charger cable having a first end and a second end, each including a connector interface adapted for engagement with a complementary connection port or plug. The cable apparatus also includes decorative tassels provided on each end of the cable that are adapted to slide over the ends of the cables to conceal or to reveal the male connector interfaces. Optionally, the tassels can be incorporated into a sleeve that entirely covers the cable.

The tassels provide a decorative and aesthetic feature that hides the connector interfaces, so that the cable as a whole can be used as a fashion accessory that happens to help charge electronic devices on-the-go. When the cable apparatus is needed to connect to an electronic device, the tassels can be slid along the cable to expose the connector interfaces. When the cable is not connected to anything, the tassels can be slid to cover the connector interfaces. Alternatively, the tassels may be fixed at ends of the cable and can be spread apart to reveal the connector interfaces.

In another aspect of the present invention, the cable can be shrouded by a single tassel having a clip for attachment to a bag or an article of clothing. The connection interfaces can be pulled from under the tassel for connecting a portable electronic device to a power source.

The cable apparatus can be connected to any purse, wristlet, wallet, bag or luggage. Similarly, the cable apparatus can attach to the user's clothing. Further, the cable apparatus can be worn around a user's wrist. Any of these modes of attachment obviates the problem of a user forgetting or misplacing the cable. For example, a clip or magnets may be provided on the cable at a position intermediate the first and second ends to define a loop in the cable. As so connected, the cable apparatus can be attached around a strap of a bag, a zipper on an article of clothing, a belt loop, or a user's wrist.

Alternatively, the cable apparatus can be used as a stand-alone accessory. For example, when needed for use, the cable apparatus can be detached from the bag or clothing for use, for example by disengaging the clip or magnet means on the cable.

In embodiments of the present invention, the first end of the cable comprises a standard USB connector interface while the second end comprises an Apple Lightning connector interface, however, any known male connector interface, including but not limited to micro-USB, mini-USB, or 34 pin connector, may be used without departing from the principles and spirit of the present invention. Additionally or alternatively, one or both ends can be adapted to interact with modular and interchangeable adapter tips so that the connection interface can be changed or adapted to work with connection ports of varying design so as to be usable with many types of portable electronic devices.

The cable apparatus may include a coating made out of any material, including leather, fabric, plastic, polyurethane, metal or the like, which allows the apparatus to become its own fashion accessory.

In operation, the cable apparatus can be used to charge portable electronic devices, namely, to provide a means whereby a portable electronic device can be connected to a power source, either a standard external power source, such as a computer, power wall socket, car charging socket, or the like, or a portable power charger. By pushing the tassel ends up along the cable, the hidden connector interfaces will appear for connection to an electronic device. The cable apparatus is designed for easy transport so that it is available whenever needed, and particularly suited to on-the-go recharging. Additionally, the cable apparatus can be used to connect devices for data exchange. In general, the cable apparatus can be used with a variety of devices, including but not limited to phones, tablet computing devices, portable computers, cameras, video cameras, Bluetooth devices, navigation systems, portable music players, speakers, and other portable electronics.

These and other objects, features and advantages of the present invention will become apparent in light of the accompanying drawings as described below.

DRAWINGS

DETAILED DESCRIPTION OF THE DRAWINGS

Figure 1:
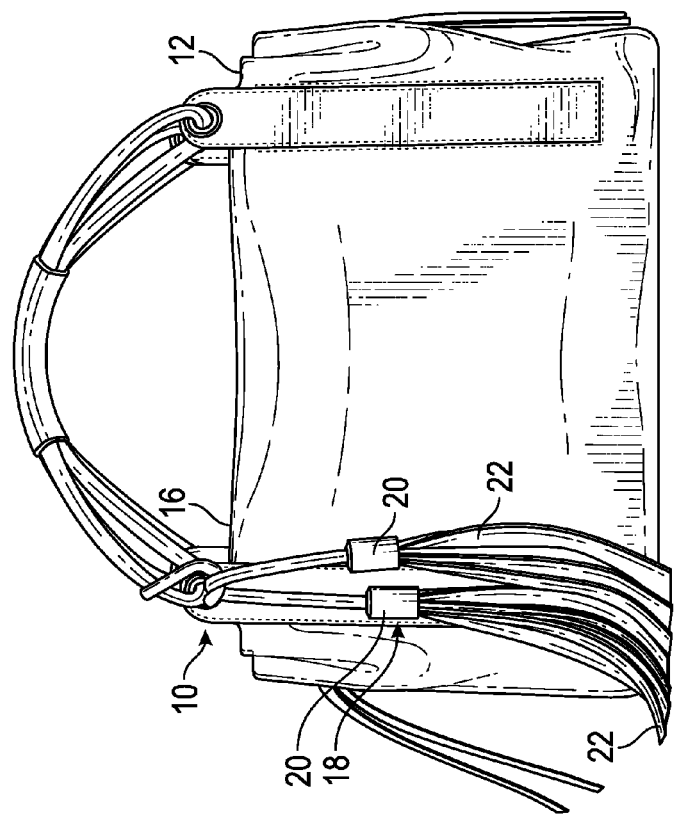
FIG. 1 illustrates a charger cable apparatus according to a first embodiment of the invention.
Figure 3:
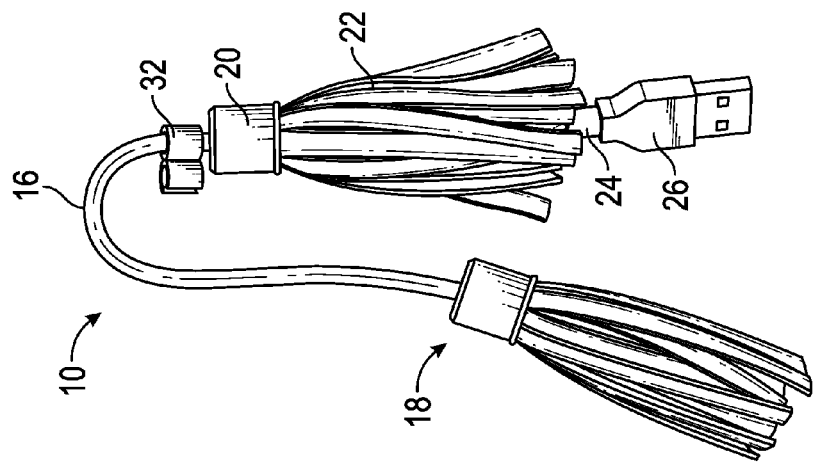
FIGS. 3-7 show various configurations of the apparatus of FIGS. 1 and 2.
Figure 4:
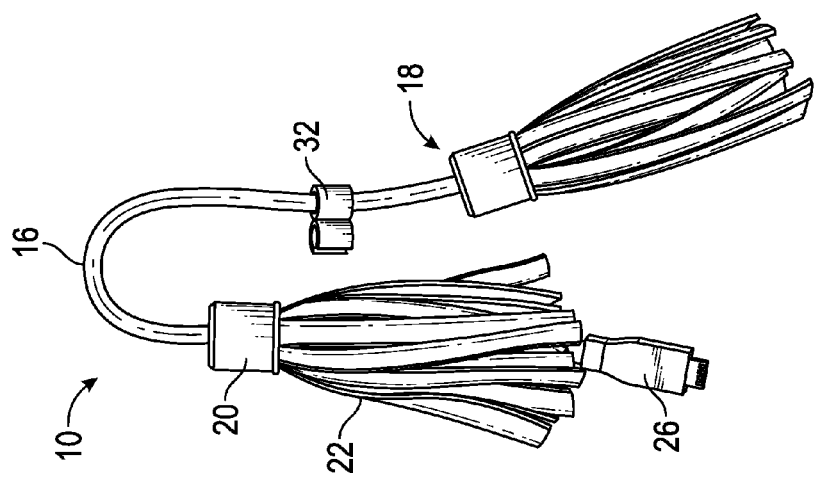
Figure 5:
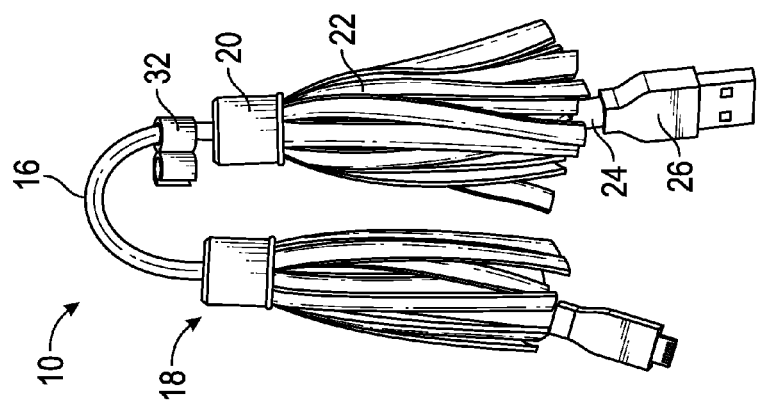

Referring to FIG. 1, a charger cable apparatus 10 can be attached to a fashion accessory 12 such as a handbag. The charger cable apparatus 10 includes a sleeve 16, which has tasseled fittings 18 at each end thereof. The tasseled fittings 18 may include nuts 20 as well as tassels 22. Alternatively, the fittings may be provided only with tassels; the nuts are optional. The sleeve can be stitched or braided leather or textile with an attractive appearance, complementary to the fashion accessory. The tassels may be of the same material as the sleeve, or of differing material. The nuts may be fabricated of metal, wood, or plastic, or of the same material as the sleeve.

In FIG. 1, the charger cable apparatus 10 is shown as being looped around a handle of a handbag, in a manner further discussed below with reference to FIGS. 2-8. However, the charger cable apparatus 10 equally can be looped through a zipper eye or a belt loop, wrapped around a user's wrist, tied around a backpack strap, or the like.

Figure 2:
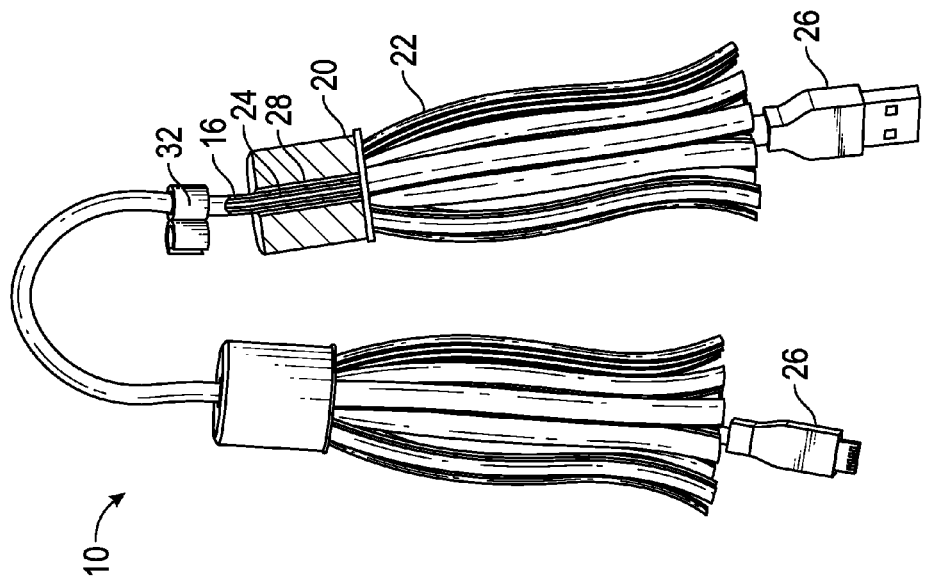
FIG. 2 shows a partial cutaway view of the apparatus of FIG. 1.

Referring to FIG. 2, which is a partial cutaway view of the charger cable apparatus 10, the sleeve 16 houses a charger cable 24, which has electrical fittings 26 at each end thereof. For example, the electrical fittings may be male connection interfaces such as USB or micro-USB, Apple Lightning or 30-pin, DC plug, or the like. Alternatively, one of the electrical fittings may be a "squid" fitting that provides more than one type of connection interface. Also, either or both of the electrical fittings 26 may include a female connection interface, e.g., a female USB plug or a female DC plug. Still further, one or both ends can be adapted to interact with modular and interchangeable adapter tips so that the connection interfaces can be changed or adapted to work with connection ports of varying designs so as to be usable with many types of portable electronic devices.

In FIG. 2, a left hand grouping of tassels 22 is shown spread apart to reveal the corresponding male connector 26 without displacing the left nut 20. The right hand grouping of tassels 22 is shown in hidden line but still covers the corresponding male connector 26. The right nut 20 is shown cut away to reveal a slide tube 28. Each of the nuts 20 may house a slide tube 28, which slidingly attaches the ends of the sleeve 16 to the charger cable 24 so that the tasseled fittings 18 may be movable along the charger cable 24 to different positions for concealing or for revealing the male connectors 26. In concealing positions, the nuts 20 would rest against or near the male connectors 26 while the tassels 22 hang over the male connectors 26. In revealing positions, one or both of the nuts 20 would be withdrawn from the male connectors 26 so that the tassels 22 do not hang over the male connectors. FIGS. 3-6 show various configurations of the sleeve 16 on the cable 24, with one or both of the tasseled fittings 18 slid back to reveal one or both of the electrical fittings 26.

Alternatively, one or both of the nuts 20 may be fixedly attached to the charger cable 24, with the corresponding tassels 22 being moved aside or spread apart to reveal the electrical fittings 26 and with the tassels being moved together to conceal the electrical fittings.

Figure 7:
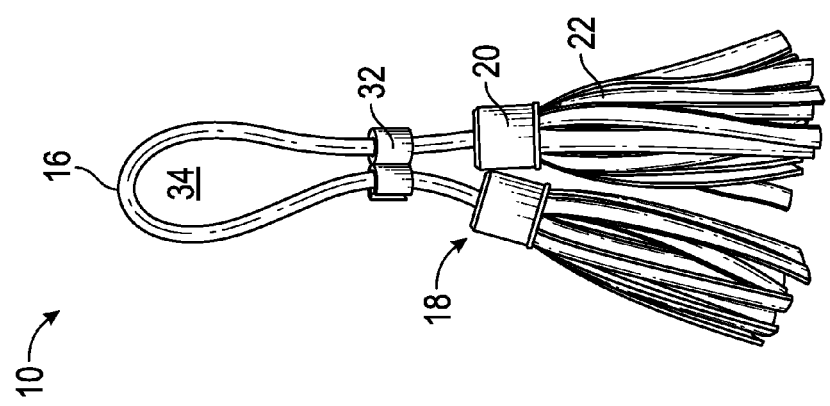
Figure 6:
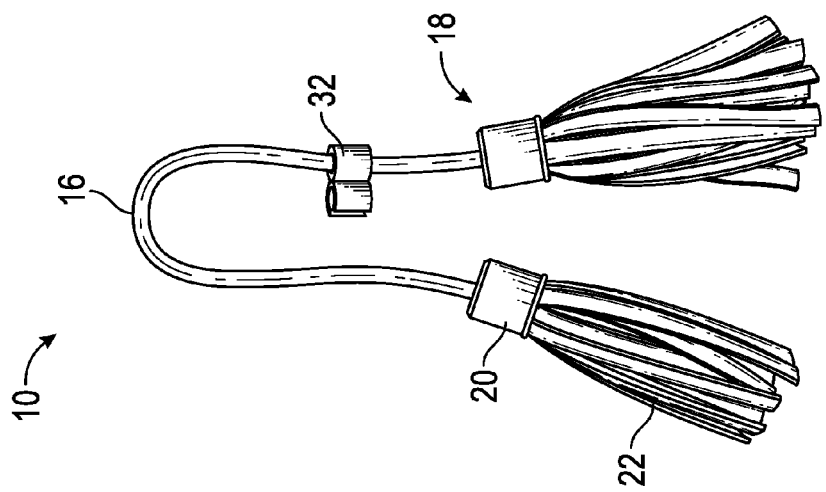

The sleeve 16 also may include at least one fastener 32 that can be attached or fitted together to form a loop 34 (as shown in FIGS. 3-8). For example, as shown in FIGS. 2-7, the fastener 32 may be a single fastener, e.g., a clip that is attached to a portion of the sleeve 16 at one side and that snaps onto and off another portion of the sleeve at the other side. Alternatively, the single fastener may be a hook, a snap hook or mini-carabiner, or the like. The charger cable apparatus 10 may be attached onto the fashion accessory 12, as shown in FIG. 1, by snapping or hooking the fastener 32 onto the sleeve 16 to form the loop 34 as shown in FIG. 7. On the other hand, when the free end of the fastener 32 has been detached from the sleeve 16 as shown in FIGS. 2-6, then the charger cable apparatus 10 can be detached from the fashion accessory.

Figure 8:
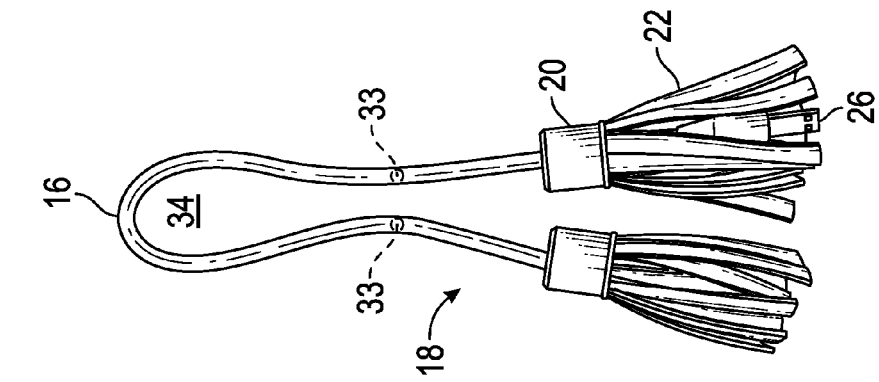
FIG. 8 shows a variant of the apparatus of FIGS. 1 and 2.

As an alternative to the clip 32, FIG. 8 shows generally that fasteners 33 may be snaps, magnets, hook-and-loop pads, or the like that are embedded into or otherwise affixed to the sleeve 16.

Alternatively to the fasteners 32 or 33, the charger cable apparatus 10 can simply be tied in a knot around a part of the fashion accessory 12, e.g., around a handle of the handbag. As another alternative, the sleeve 16 may be provided as a strap of the handbag 12, with the nuts 20 supporting the handbag and the charger cable being embedded into the bag or strap itself.

Figure 9:
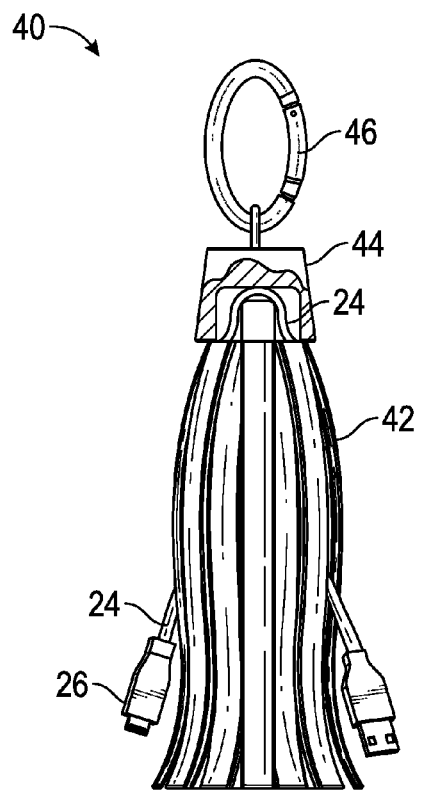
FIG. 9 shows a charger cable apparatus according to a second embodiment of the invention.

FIG. 9 shows another alternative, in an embodiment of a charger cable apparatus 40, in which a single large tassel 42 conceals the entire charger cable 24 and both of the electrical fittings 26. The charger cable 24 is looped through and held in a large nut 44 at the top of the tassel 42. The large nut 44 connects the tassel 42 to a carabiner or similar clip or hook 46. The charger cable apparatus 40 then can be hooked onto a handle of a handbag, or a backpack strap, by way of the carabiner 46. The charger cable 24 can be adapted to slide within the nut 44 for example to extend one end of the cable further out from the tassel 42 in order to facilitate connection with an electronic device or with a power source or both.

Figure 10:
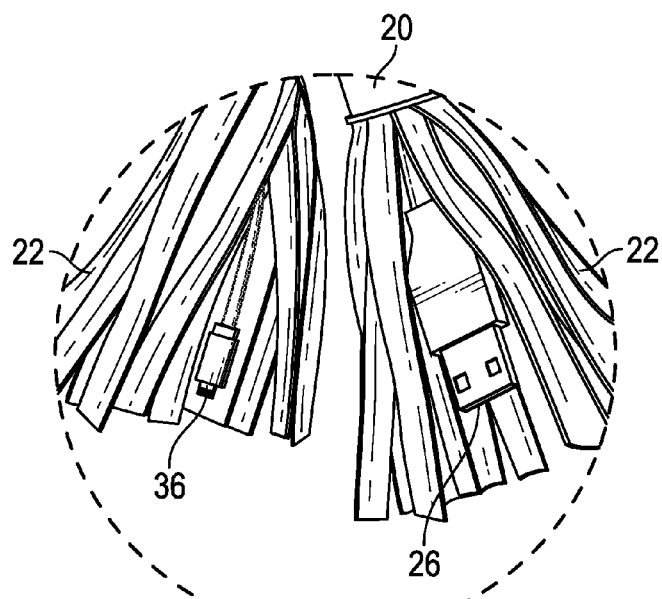
FIG. 10 shows a charger cable apparatus according to a third embodiment of the invention.

FIG. 10 shows an embodiment in which the charger cable 24 has a male connector 26 (e.g., a USB plug) at only a first end, and has a light 36 (e.g., an LED lamp) at a second end.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A charging cable apparatus comprising:
   a charger cable having a first electrical fitting at a first end and having a second electrical fitting at a second end; and
   first and second tassels mounted at respective first and second ends of the charger cable with said cable extending through each of the first and second tassels, wherein each tassel is movable between a concealing condition in which the tassel covers the respective first or second electrical fitting, and a revealing condition in which the tassel does not cover the respective first or second electrical fitting.

2. The apparatus of claim 1 wherein at least one of the tassels is movable between the concealing condition and the revealing condition by sliding the tassel along the charger cable.

3. The apparatus of claim 1 further including first and second nuts each defining central axial openings therethrough, wherein the first and second tassels are mounted to the respective first or second end of the charger cable by said first and second nuts, respectively, with the charger cable passing through the central axial openings of said nuts.

4. The apparatus of claim 3 wherein each of the first and second nuts houses a slide tube rendering said nuts slidably movable along the charger cable.

5. The apparatus of claim 3 wherein at least one of the first and second nuts is fixedly attached to the charger cable.

6. The apparatus of claim 1 wherein one of the first or second electrical fittings is a male USB plug.

7. The apparatus of claim 1 wherein one of the first or second electrical fittings is a male micro-USB plug.

8. The apparatus of claim 1 wherein one of the first or second electrical fittings is an LED lamp.

9. The apparatus of claim 1 further comprising a fastener fixedly attached at a first portion of the charger cable and releasably engageable with a second portion of the charger cable for forming a loop of the apparatus.

10. The apparatus of claim 9 wherein the fastener is a clip or a hook.

11. The apparatus of claim 9 wherein the fastener includes a first magnet or a first snap at the first portion of the charger cable and a respective second magnet or a respective second snap at the second portion of the charger cable.

* * * * *